US008516250B2

(12) United States Patent
Lohiniva et al.

(10) Patent No.: US 8,516,250 B2
(45) Date of Patent: Aug. 20, 2013

(54) LOCK ADMINISTRATION SYSTEM

(75) Inventors: Seppo Lohiniva, Oulu (FI); Mika Pukari, Oulu (FI)

(73) Assignee: ILOQ Oy, Oulu (FI)

( * ) Notice: Subject to any disclaimer, the term of this patent is extended or adjusted under 35 U.S.C. 154(b) by 530 days.

(21) Appl. No.: 12/680,476

(22) PCT Filed: Sep. 24, 2008

(86) PCT No.: PCT/FI2008/050529

§ 371 (c)(1), (2), (4) Date: May 3, 2010

(87) PCT Pub. No.: WO2009/040470

PCT Pub. Date: Apr. 2, 2009

(65) Prior Publication Data

US 2010/0217972 A1 Aug. 26, 2010

(30) Foreign Application Priority Data

Sep. 28, 2007 (EP) .................................... 07117498

(51) Int. Cl.
*H04L 9/32* (2006.01)

(52) U.S. Cl.
USPC .................................... 713/168; 726/4; 726/5

(58) Field of Classification Search
USPC .......................................... 713/168; 726/4-5
See application file for complete search history.

(56) References Cited

U.S. PATENT DOCUMENTS

| | | | | |
|---|---|---|---|---|
| 5,602,536 | A | 2/1997 | Henderson et al. | |
| 2003/0128101 | A1* | 7/2003 | Long | 340/5.26 |
| 2004/0025039 | A1* | 2/2004 | Kuenzi et al. | 713/193 |

FOREIGN PATENT DOCUMENTS

| | | | |
|---|---|---|---|
| EP | 1 024 239 | A1 | 8/2000 |
| EP | 1 132 871 | A2 | 9/2001 |
| EP | 1 249 797 | A2 | 10/2002 |
| EP | 1 549 020 | A2 | 6/2005 |
| EP | 1 653 415 | A1 | 5/2006 |
| JP | 07-502871 | A | 3/1995 |
| JP | 3485254 | B2 | 10/2003 |
| JP | 2004-204441 | A | 7/2004 |
| JP | 2004-326292 | A | 11/2004 |
| JP | 2005-525731 | A | 8/2005 |
| JP | 2006-164250 | A | 6/2006 |
| JP | 2007-094892 | A | 4/2007 |
| WO | WO 2005/085975 | A1 | 9/2005 |
| WO | WO 2006/136662 | A1 | 12/2006 |

* cited by examiner

*Primary Examiner* — Eleni Shiferaw
*Assistant Examiner* — Jing Sims
(74) *Attorney, Agent, or Firm* — Birch, Stewart, Kolasch & Birch, LLP

(57) ABSTRACT

A lock administration system for self-powered locks is provided. The system comprises an ASP (application service provider) server operationally connected to the Internet and configured to store lock system related information, at least one client module configured to control the generating of shared secrets for encrypting and decrypting, and the generating and the encrypting of lock access data packets using a token, transmit the data packets to the ASP server using public networks, receive an encrypted status packet from the ASP server using public networks, control the decrypting of the status packet and send information regarding the decrypt status packet to the ASP server using public networks and at least one lock configured to receive data packets from the ASP server via public networks, decrypt the data packets and send an encrypted status packet to the ASP server using public networks.

13 Claims, 8 Drawing Sheets

LOCK ADMINISTRATION SYSTEM

FIELD

The invention relates to lock administration systems for electromechanical locks. Especially, the invention relates to systems for self-powered locks.

BACKGROUND

Various types of electromechanical locks are replacing the traditional mechanical locks. Electromechanical locks require an external supply of electric power, a battery inside the lock, a battery inside the key, or means for generating electric power within the lock making the lock self-powered. Electromechanical locks provide many benefits over traditional locks. They provide better security and the control of keys or security tokens is easier.

In addition, most electromechanical locks and/or keys and tokens are programmable. It is possible to program the lock to accept different keys and decline others.

One problem associated with electromechanical and self-powered locks is the programming of locks and keys. In many known electromechanical locking systems the lock manufacturer delivers factory programmed locks to the end user. The lock manufacturer has performed required programming of the locks belonging to a given locking system.

BRIEF DESCRIPTION

According to an aspect of the present invention, there is provided a lock administration system for self-powered locks, comprising: an ASP (application service provider) server operationally connected to the Internet and configured to store lock system related information; at least one client module configured to control the generating of shared secrets for encrypting and decrypting, and the generating and the encrypting of lock access data packets using a token, transmit the data packets to the ASP server using public networks, receive an encrypted status packet from the ASP server using public networks, control the decrypting of the status packet and send information regarding the decrypt status packet to the ASP server using public networks; and at least one lock configured to receive data packets from the ASP server via public networks, decrypt the data packets and send an encrypted status packet to the ASP server using public networks.

According to another aspect of the present invention, there is provided a method for administrating a system for self-powered locks, comprising: controlling by a client module the generation of shared secrets for encrypting and decrypting; generating lock access data packets using a security token; encrypting the generated lock access data packets using a token; transmitting the encrypted data packets to an ASP (application service provider) server using public networks; storing the encrypted data packets in the ASP server; reading the encrypted data packets by a lock from the server via public networks; decrypting the data packets in the lock; generating encrypted status packet in the lock and the packet to the ASP server; reading a status packet from the ASP server and controlling the decrypting of the status packet by a client module; transmitting information regarding the decrypt status packet from the client module to the ASP server.

According to another aspect of the present invention, there is provided a client module in a lock administration system for self-powered locks, the system comprising an ASP (application service provider) server operationally connected to the Internet and configured to store lock system related information, the client module being configured to: generate shared secrets for encrypting and decrypting, generate a unique key secret from key data and the shared secret using a token; generate and encrypt lock access data packets using a security token; and communicate with the ASP server using public networks.

According to yet another aspect of the present invention, there is provided a lock in a lock administration system for self-powered locks, the system comprising an ASP (application service provider) server operationally connected to the Internet and configured to store lock system related information; the lock being configured to: receive data packets from the ASP server; decrypt the data packets, generate a shared secret using the data packet information, store the shared secret and send an encrypted status packet to the ASP server.

The invention has several advantages. The proposed solution enables flexible lock and key programming. The lock manufacturer or distributor maintains an ASP server which maintains a database of locking systems. However, the lock and key programming is performed by the end user. Thus, the lock manufacturer may deliver locks in an initial state in which the locks do not belong to any particular locking system. The initial state locks do not store any security sensitive information.

In the proposed solution, locks need not have a dedicated wired connection to the ASP server. Encrypted lock programming data may be transmitted to the lock via public networks, which may be wired or wireless connections.

LIST OF DRAWINGS

Embodiments of the present invention are described below, by way of example only, with reference to the accompanying drawings, in which FIG. 1 illustrates an example of the structure of a lock administration system;

DESCRIPTION OF EMBODIMENTS

The following embodiments are exemplary. Although the specification may refer to "an", "one", or "some" embodiment(s) in several places, this does not necessarily mean that each such reference is made to the same embodiment(s), or that the feature only applies to a single embodiment. Features of different embodiments may also be combined to provide other embodiments.

Figure 1:
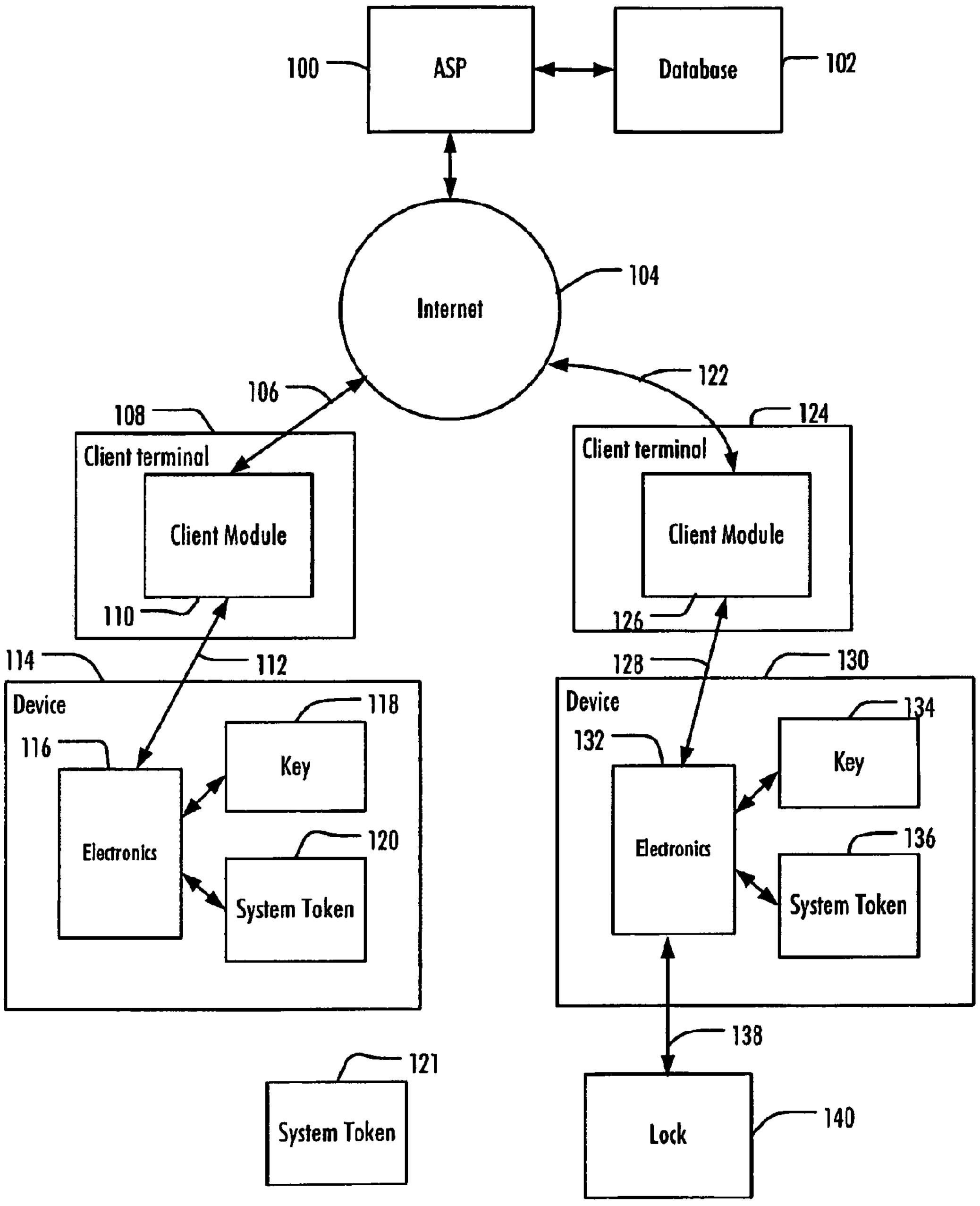

With reference to FIG. 1, an example of the structure of a lock administration system is explained. The system comprises an application service provider (ASP) server 100 operationally connected to the Internet 104 and configured to store lock-system-related information to a database 102. The database 102 may be realised with detachable or fixed mass storage in the server or it may be a separate computer. Other realisations are also feasible. Typically, a lock system manufacturer or a lock system distributor maintains the ASP server 100. The database maintains data on locks and keys belonging to the locking system. The data comprises information on lock and key identities, key holders, lock and key status and access rights, for example.

The system further comprises a client module 110. The client module may be client software run in a client terminal 108 at a clients premises. Typically, the client terminal 108 is a personal computer or a corresponding processing unit connected to the Internet 104 through a wired or wireless connection 106.

The implementation of the client module 110 may vary, depending on the client terminal design. The client module may consist program instructions coded by a programming language, which may be a high-level programming language, such as C, Java, etc., or a low-level programming language, such as a machine language, or an assembler.

The client module 110 may be configured to manage locking-system-related information. For example, the client module may generate shared secrets for encrypting and decrypting, and generate and encrypt lock access data packets using a security token.

The client module may be connected 112 to a first device 114 configured to be in connection with a key 118 and a system token 120. The connection 112 between the client module and the first device may be realised with a wired or a wireless connection. The connection may be realised with USB, Bluetooth, Infrared or other known wireless techniques.

The first device 114 comprises an electronic circuit 116 and holders for a key 118 and a token 120. The electronic circuit 116 may comprise a processor and a memory for storing data and software for the processor. The electronic circuit may be configured to perform calculations relating to locking data and transfer information between the client module, key and the system token. The first device 114 and the client terminal 108 offer a platform for the client module 110 and a key 118 and a system token 120 communications. The client module 110 and the ASP server 100 communicate with the system token 120 for storing shared secrets of the lock system and for encrypting and decrypting lock access data packets and for authenticating a user access in the lock system.

The lock administration system may further comprise a second client module 126. The second client module 126 may be client software run in a client terminal 124. The client terminal 124 may be a personal computer, a personal data assistant (pda) or a mobile phone connected 122 to the Internet 104. The second client module 126 may be implemented in the same manner as the client module 110.

The second client module 126 may be connected 128 to a second device 130 configured to be in connection with a key 134 and a system token 136. The connection 128 between the second client module and the second device may be realised with a wired or a wireless connection. The connection may be realised with USB, Bluetooth, Infrared or other known wireless techniques. In addition, the second device may have a connection 138 to a lock 140. The connection may be wired or wireless. For example, a wired connection may be realised with a 1-wire bus connection. A wired connection may provide electric power to the self-powered lock. A wireless connection may be realised with known wireless protocols.

The second device 130 and the client terminal 124 offer a platform for the client module 126, the key 134, the system token 136 and the lock 140 communications for storing shared secrets of the locking system and for encrypting and decrypting lock access data packets and for authenticating a user access in the lock system.

In an embodiment, the first device and the second device are identical devices.

In an embodiment, the user of the client module 110 or 126 establishes a session between the client module and the ASP server 100 by logging in to the ASP server 100. The client module may contact the ASP server and check if there is an updated version of the module available. If so, the updated version may be downloaded and installed on the client terminal. After the required locking system administration operations have been initiated or performed the session may be ended by logging out of the ASP server.

Figure 2:
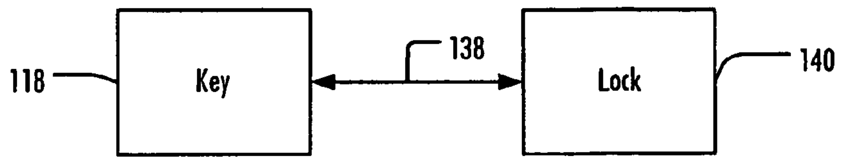
FIG. 2 illustrates a key and a lock.

FIG. 2 illustrates a key 118 and a lock 140. The lock 140 is configured to read access data from the key 118 and match the data against a predetermined criterion. The key 118 comprises an electronic circuit configured to store access data and perform calculations relating to encrypting and decrypting. The electronic circuit may be an iButton® (www.ibutton.com) of Maxim Integrated Products, for example; such an electronic circuit may be read with 1-Wire® protocol. The electronic circuit may be placed in a key or a token, for example, but it may be positioned also in another suitable device or object. The only requirement is that the lock may read the data from the electronic circuit. The data transfer from the key to the lock 140 may be performed with any suitable wired or wireless communication technique. In self-powered locks, produced energy amount may limit the techniques used. Magnetic stripe technology or smart card technology may also be used in the key. Wireless technologies may include RFID (Radio-frequency identification) technology, or mobile phone technology, for example. The key may comprise a transponder, an RF tag, or any other suitable memory type capable of storing data.

The data read from the key is used for authentication by matching the data against the predetermined criterion. The authentication may be performed with SHA-1 (Secure Hash Algorithm) function, designed by the National Security Agency (NSA). In SHA-1, a condensed digital representation (known as a message digest) is computed from a given input data sequence (known as the message). The message digest is to a high degree of probability unique for the message. SHA-1 is called "secure" because, for a given algorithm, it is computationally infeasible to find a message that corresponds to a given message digest, or to find two different messages that produce the same message digest. Any change to a message will, with a very high probability, result in a different message digest. If security needs to be increased, other hash functions (SHA-224, SHA-256, SHA-384 and SHA-512) in the SHA family, each with longer digests, collectively known as SHA-2 may be used. Naturally, any suitable authentication technique may be used to authenticate the data read from the external source. The selection of the authentication technique depends on the desired security level of the lock 140 and possibly also on the permitted consumption of electricity for the authentication (especially in user-powered electromechanical locks).

Figure 3A:
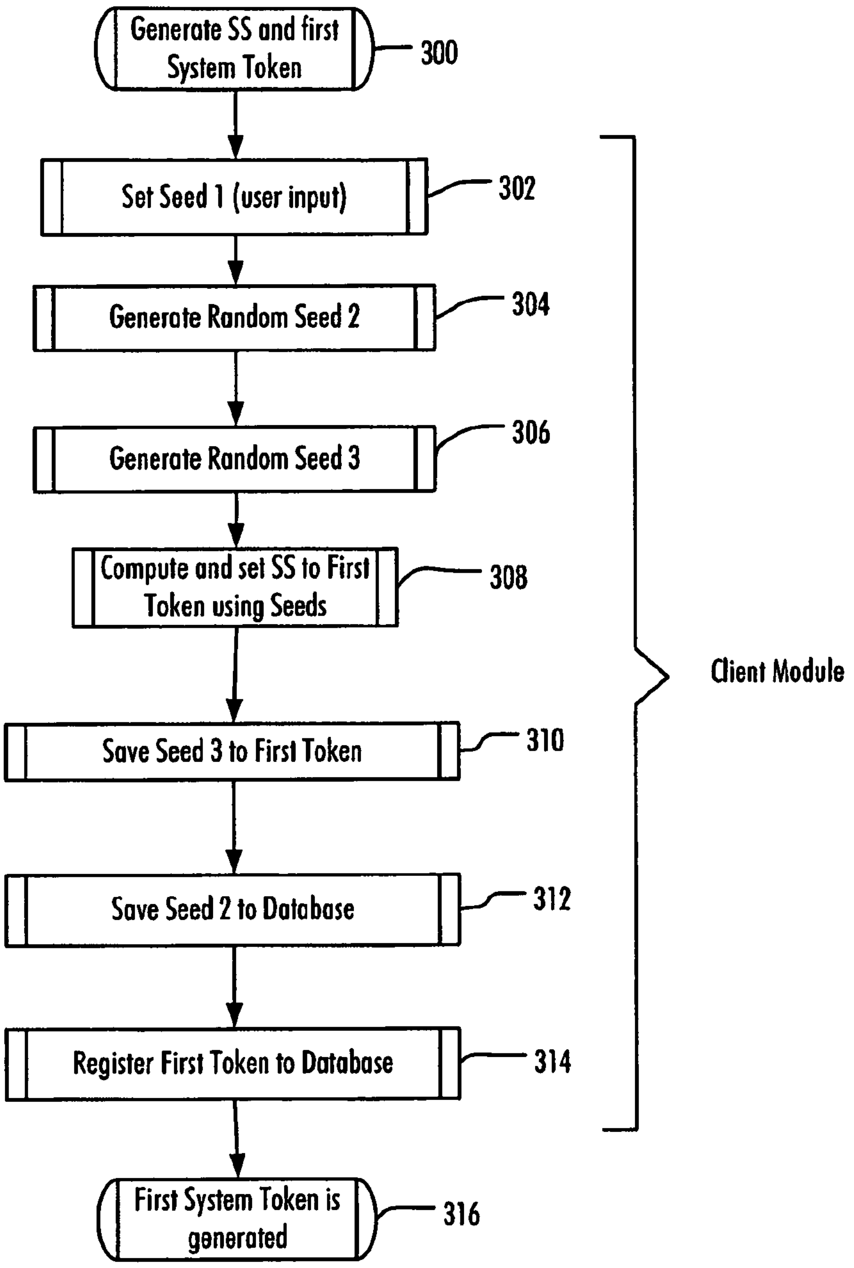
FIG. 3A is a flowchart illustrating an embodiment where a locking-system-shared-secret is generated.

FIG. 3A is a flowchart illustrating an embodiment where a locking-system-shared-secret (SS) is generated and a first system token is created into the locking system. The locking system shared secret is utilised in encrypting and decrypting lock access data. A system token comprises an electronic circuit described above and it is used in the first device 114 for generating and storing the locking system shared secret. The system token is a special token as it is not used as a key but for programming keys and locks of the locking system. Typically, creating a system token is the first step in programming locks and keys for a new locking system. A locking system may have more than one system tokens but they all store the identical locking-system-shared-secret.

The client module 110 is responsible for controlling the generation of the locking system shared secret and the system token. As the client module resides in a client terminal the procedure may be performed at the client's premises provided that the client module has Internet access and the device 114 is connected to the client terminal 108. In an embodiment, the client module 110 controls the device 114 to perform some or all of the tasks which in the following are allocated to the client module. The lock manufacturer or distributor has no part in the process other than maintaining the ASP server 100.

The process starts in step 300 when the user sets an empty token 120 into the first device 114.

In step 302, the client module 110 requests the user to type in seed 1. Seed 1 can be typically an alphanumeric string having 10-20 characters. Seed 1 is not stored in the system. The user must remember it.

In step 304, the client module 110 generates seed 2 using a random number generator. Seed 2 is typically 10 to 20-byte long list of numbers. Each byte can have any value between 0 and 255.

In step 306, the client module 110 generates seed 3 using a random generator. Seed 3 is typically 10 to 20 bytes long. Each byte can have any value between 0 and 255.

In step 308, the client module 110 sends seeds 1-3 to the token 120. The token receives the seeds and generates an SHA-1 hash to be used as the locking system shared secret. The token 120 stores the shared secret into its hidden write only memory. The shared secret is not transmitted back to the client module or revealed to the user.

The hash may be generated using some other cryptographic hash function, as one skilled in the art is well aware. SHA-1 is used in this document merely as an example.

In an embodiment, the client module 110 is configured to calculate the hash which is used as the shared secret and to send the hash to the token 120 which stores the hash.

In step 310, the client module 110 stores seed 3 in the token 120.

In step 312, the client module 110 transmits seed 2 to the locking system database 102 maintained by the ASP server. This transmission may be encrypted with SSL (Secure Sockets Layer), for example.

In step 314, the client module 110 registers the token 120 as a system token in the locking system database 102. Each token may have a unique serial number which may be stored in the database 102. This storing may be encrypted with SSL (Secure Sockets Layer), for example.

The process ends in 316.

Figure 3B:
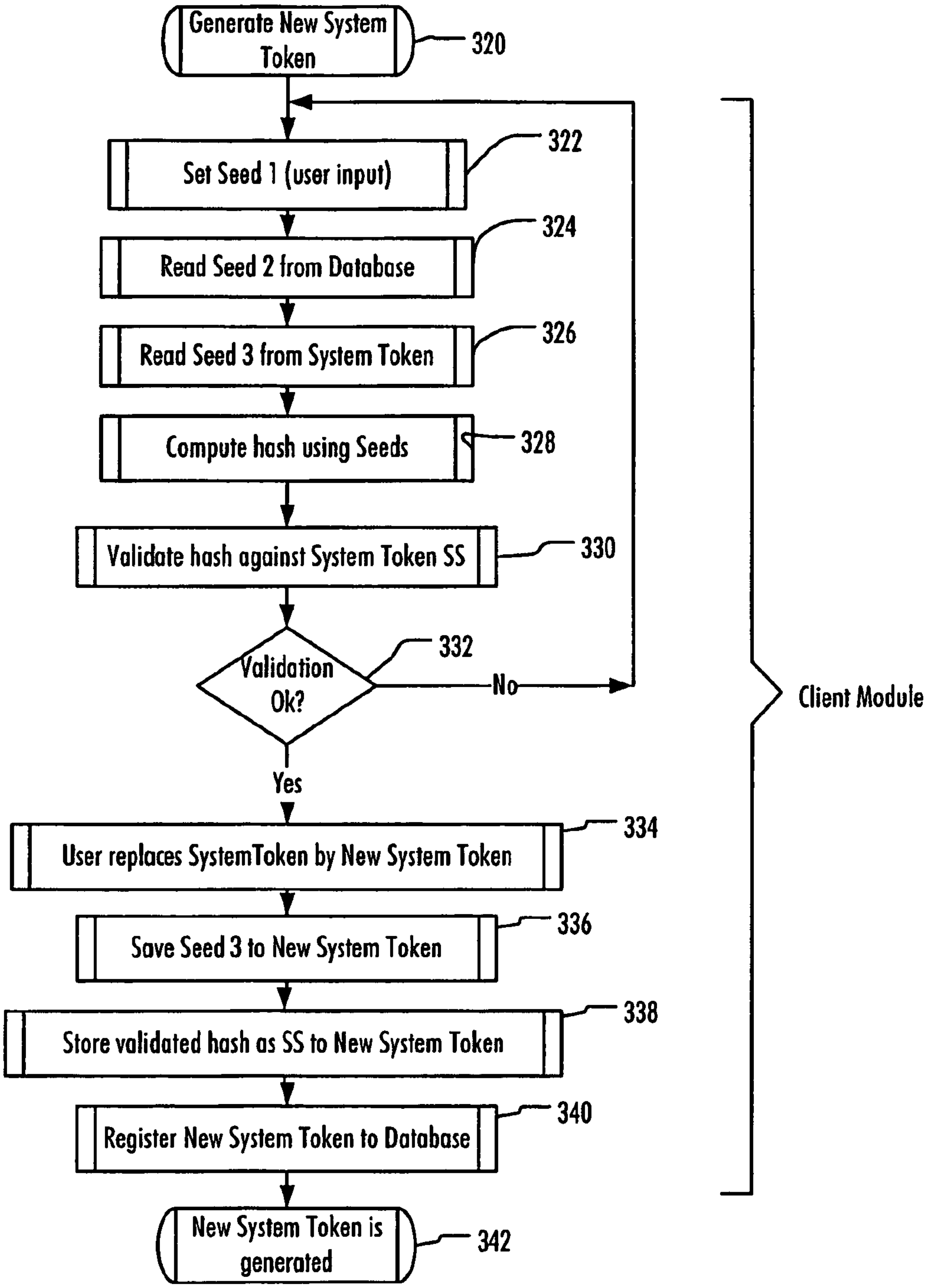
FIG. 3B is a flowchart illustrating an embodiment where an additional system token is created into the locking system.

FIG. 3B is a flowchart illustrating an embodiment where an additional system token is created into the locking system. The locking system already has at least one system token which was created using the procedure described in FIG. 3A. The client module 110 is responsible for controlling the generation of the additional system token. As the client module resides in a client terminal the procedure may be performed at the client's premises provided that the client module has Internet access and the device 114 is connected to the client terminal 108. In an embodiment, the client module 110 controls the device 114 to perform some or all of the tasks which in the following are allocated to the client module. The lock manufacturer or distributor has no part in the process other than maintaining the ASP server 100.

The process starts in step 320 when the user has one of the existing system tokens 120 installed in the device 114.

In step 322, the client module 110 requests the user to type in seed 1. Seed 1 must be exactly the same as the one typed when generating the first system token 120.

In step 324, the client module 110 contacts the lock system database 102 via the Internet and reads seed 2 from the database 102.

In step 326, the client module 110 reads seed 3 from the existing system token 120 installed in the device 114.

In step 328, the client module 110 uses seeds 1 to 3 and generates an SHA-1 hash.

In step 330, the client module 110 validates the hash using the existing system token 120.

In step 332, the validation result is analysed. If the validation fails, the user has probably typed an incorrect seed 1 and the process is cancelled or restarted from step 322.

Otherwise, the process continues in step 334, where the client module requests the user to remove the existing system token 120 from the device 114 and set an empty token 121 into the device 114.

In step 336, the client module 110 stores seed 3 in the new token 121.

In step 338, the client module 110 sends seeds 1 and 2 to the token 120. The token receives the seeds and generates an SHA-1 hash using seeds 1 to 3. The generated hash is the locking system shared secret, the same that is stored in the first system token 120. The token stores the hash as the shared secret in its hidden write-only memory.

In step 340, the client module 110 registers the new system token 121 into the lock system database 102. This transmission may be encrypted with SSL (Secure Sockets Layer), for example.

The process ends in 342.

Figure 3C:
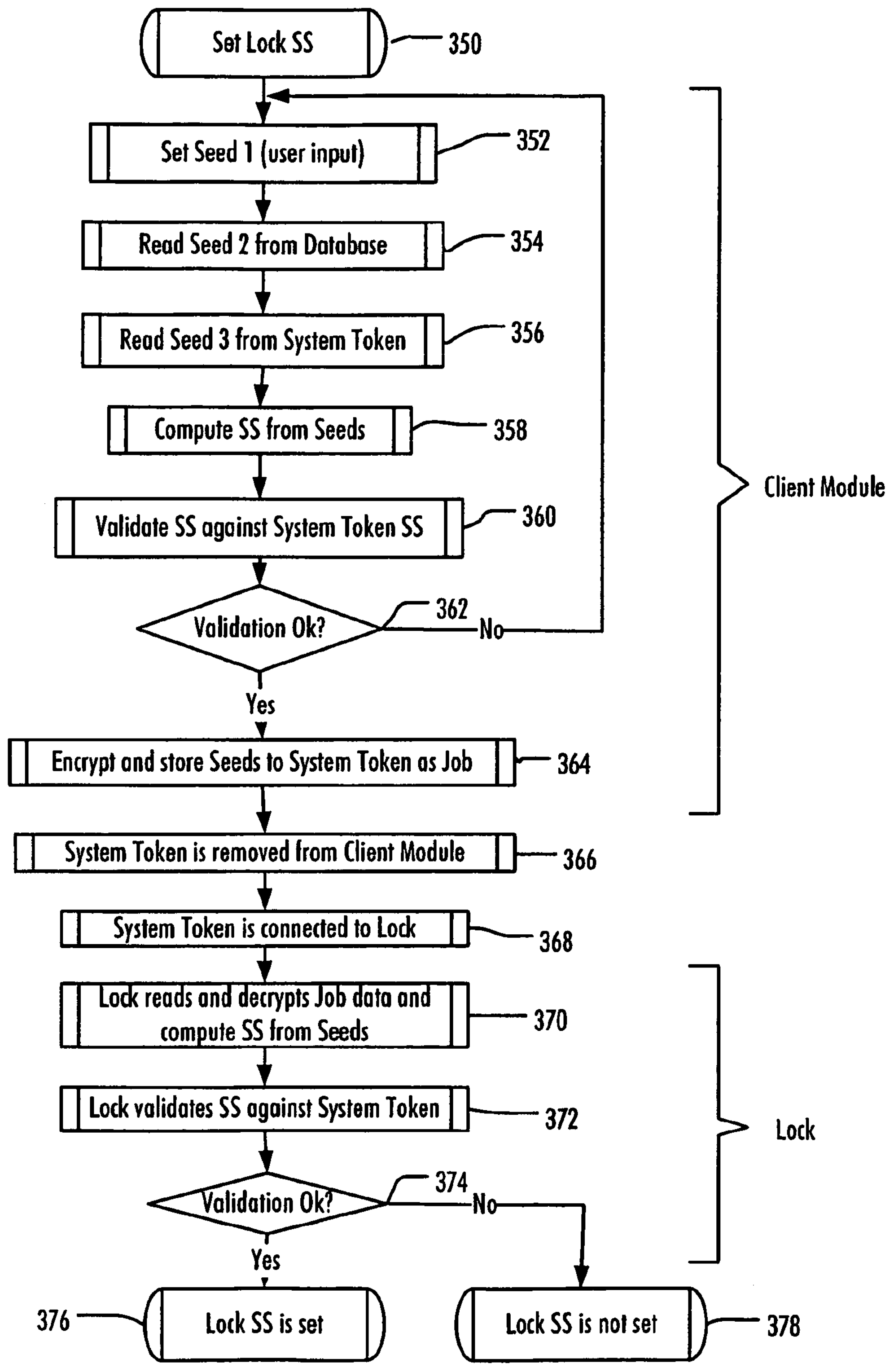
FIG. 3C is a flowchart illustrating an embodiment where the locking-system-shared-secret is transferred into a lock.

FIG. 3C is a flowchart illustrating an embodiment where the locking system shared secret is transferred into a lock.

The process starts in step 350 when a user has one of the existing system tokens 120 installed in the device 114. Again, the client module 110 is responsible for the initial steps. As the client module 110 resides in a client terminal 108 the procedure may be performed at the client's premises provided that the client module 110 has Internet access and the device 114 is connected to the client terminal 108. The initial steps 350 to 366 may be performed at a site other than the one where the lock is situated. The lock manufacturer or distributor has no part in the process other than maintaining the ASP server 100. In an embodiment, the client module 110 controls the device 114 to perform some or all of the tasks which in the following are allocated to the client module.

In step 352, the client module 110 requests the user to type in seed 1. Seed 1 must be exactly the same as the one typed when generating the first system token 120.

In step 354, the client module 110 contacts the lock system database 102 via the Internet and reads seed 2 from the database 102.

In step 356, the client module 110 reads seed 3 from the system token 120 installed in the device 114.

In step 358, the client module 110 uses seeds 1 to 3 and generates an SHA-1 hash. The hash corresponds to the shared secret of the locking system.

In step 360, the client module 110 validates the hash against the shared secret stored in the system token 120 installed in the device 114.

In step 362, the validation result is analysed. If the validation fails, the user has probably typed an incorrect seed 1 and the process is cancelled or restarted from step 332.

Otherwise, the process continues in step 364 where seeds 1 to 3 are encrypted and stored in the system token as a programming job to a lock.

In step 366, the system token 120 is removed from the device 114 connected to the client module 110.

The remaining steps of the procedure are performed at the site where the lock is installed. A client terminal 124 comprises a second client module 126. The client terminal may be a personal computer, a pda, a smart phone or a corresponding apparatus. A second device 130 is connected to the client terminal and to the second client module and it has a connection to a lock 140.

In step 368, a system token 120 (which is illustrated as token 132 in FIG. 1) is plugged into the device 130 which is connected to the lock 140.

In step 370, the lock 140 reads a programming job from the system token 120, decrypts seeds 1 to 3 and generates an SHA-1 hash.

In step 372, the lock 140 validates the hash against the shared secret stored in the system token 120 installed in the device 130.

In step 374, validation result is analysed.

If the validation fails, the lock 140 sets an error and does not set the locking system shared secret in step 378.

If the validation succeeds, the shared secret is stored in the lock 140 in step 378.

Process ends in step 376 or 378.

Steps 368 to 378 may be repeated on several locks. It is possible to transfer the locking system shared secret to several locks with the same initial steps.

Figure 3D:
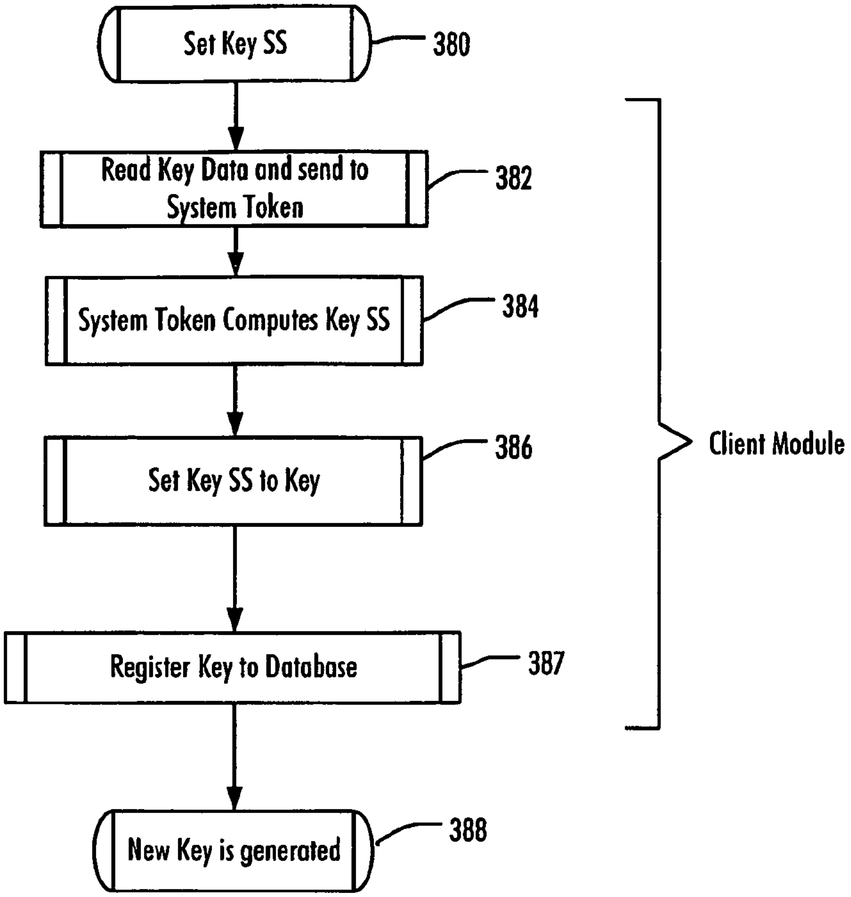
FIG. 3D is a flowchart illustrating an embodiment where a key shared secret is set to a new key.

FIG. 3D is a flowchart illustrating an embodiment where a key shared secret is set to a new key. The client module 110 is responsible for controlling the generation of the shared secret. As the client module resides in a client terminal, the procedure may be performed at the client's premises provided that the client module has Internet access and the device 114 is connected to the client terminal 108. The lock manufacturer or distributor has no part in the process other than maintaining the ASP server 100. In an embodiment, the client module 110 controls the device 114 to perform some or all of the tasks which in the following are allocated to the client module.

The process starts in step 380 when a new key 118 and an existing system token 120 are connected in the device 114.

In step 382, the client module 110 reads key data from the key 118 and sends it to the system token 120. The key data may comprise a key serial number.

In step 384, the system token 120 computes key shared secret using key data and the locking system shared secret.

In step 386, the client module 110 sets the key shared secret to the new key 118.

In step 387, the client module 110 registers the new key 188 into the lock system database 102. This transmission may be encrypted with SSL (Secure Sockets Layer), for example.

The process ends in 388.

In addition to the above, additional access data may be programmed into a key of the locking system. In an embodiment, the key stores a data structure comprising key identification, the key shared secret and access group data. Each key has a unique identification ID which may be used to identify the key. The access group data comprises one or more access groups the key belongs to.

In an embodiment, a key may open a lock if it belongs to an access group to which access is allowed or if the key has a key identification ID to which access is allowed.

With the access groups, the organization of keys is greatly enhanced. A key may be provided with several access groups to allow access to different locations. For example, the same key may provide access to an apartment (access group 1), a cellar (access group 2), a garage (access group 3), and a waste bin shelter (access group 4). A user may then provide a waste management company with a key comprising only the access group 4. Thus, the company may be provided an access to the waste bin shelter but the key does not authorize access to other parts of the building.

Figure 3E:
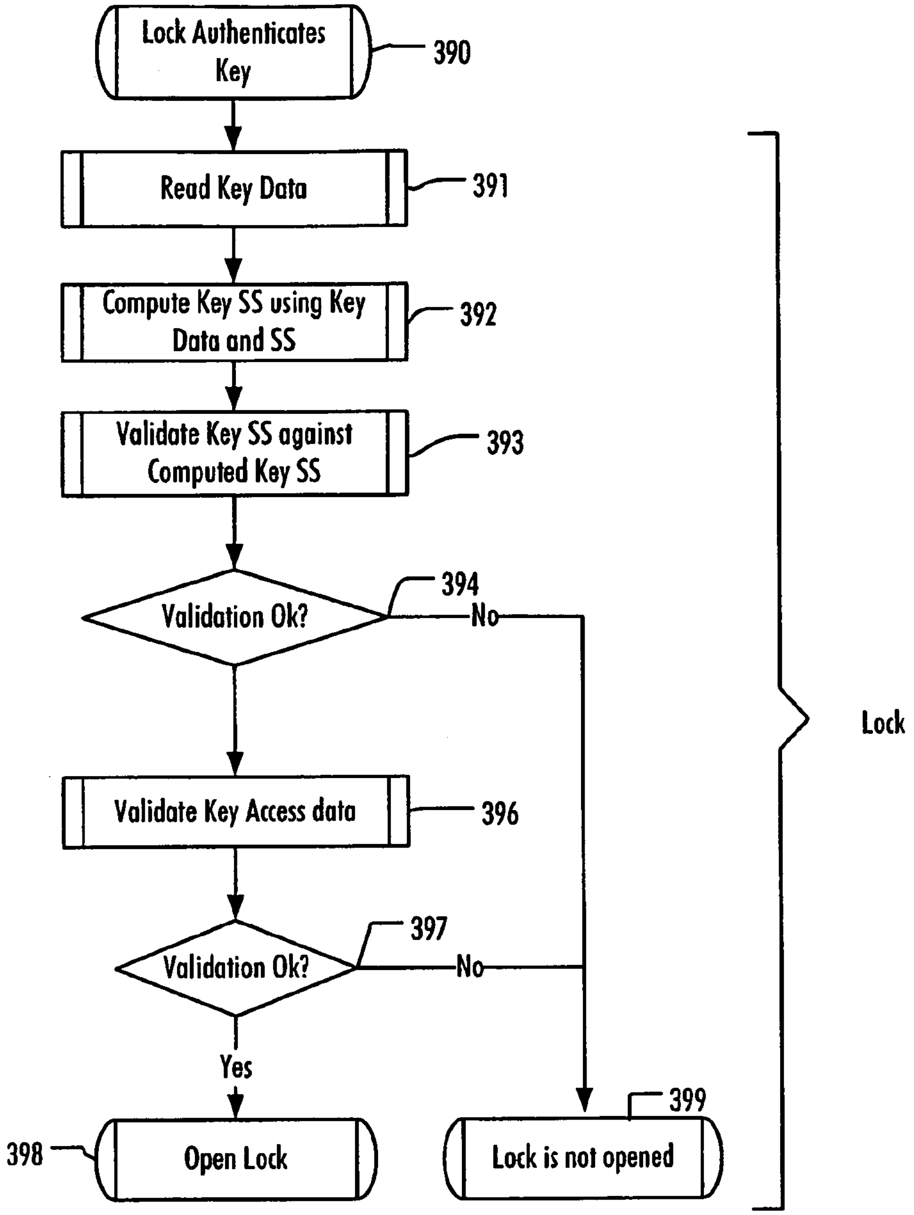
FIG. 3E is a flowchart illustrating an embodiment where a lock is about to be opened using a key.

FIG. 3E is a flowchart illustrating an embodiment where a lock 140 is about to be opened using a key 118.

The process starts in step 390 when a user inserts the key 118 into the lock 140. At this phase, a self-powered lock may generate electric power from the key movement as the key is inserted into the lock. Alternatively, the lock may comprise a battery.

In step 391, the lock 140 reads key data and a hash from the key 118.

In step 392, the lock 140 computes an SHA-1 hash using the key data and the locking system shared secret stored in the lock.

In step 393, the lock 140 validates the hash computed by the lock against the hash read from the key 118.

In step 394, the validation result is analysed.

In step 399, if the validation fails, the lock 140 sets an error and does not open and the process ends.

If the validation succeeds, the lock 140 validates the key access data in step 396.

In step 397, the validation result is analysed. The key access data compromises information of possible access groups the key belongs to. The lock checks if there is a match between the access groups the key belongs to and the access groups the lock is programmed to open.

If the validation fails, the lock 140 sets an error and does not open. This is done in step 399.

If the validation succeeds, the lock 140 is opened in step 398.

The process ends in steps 398 or 399.

Figure 4:
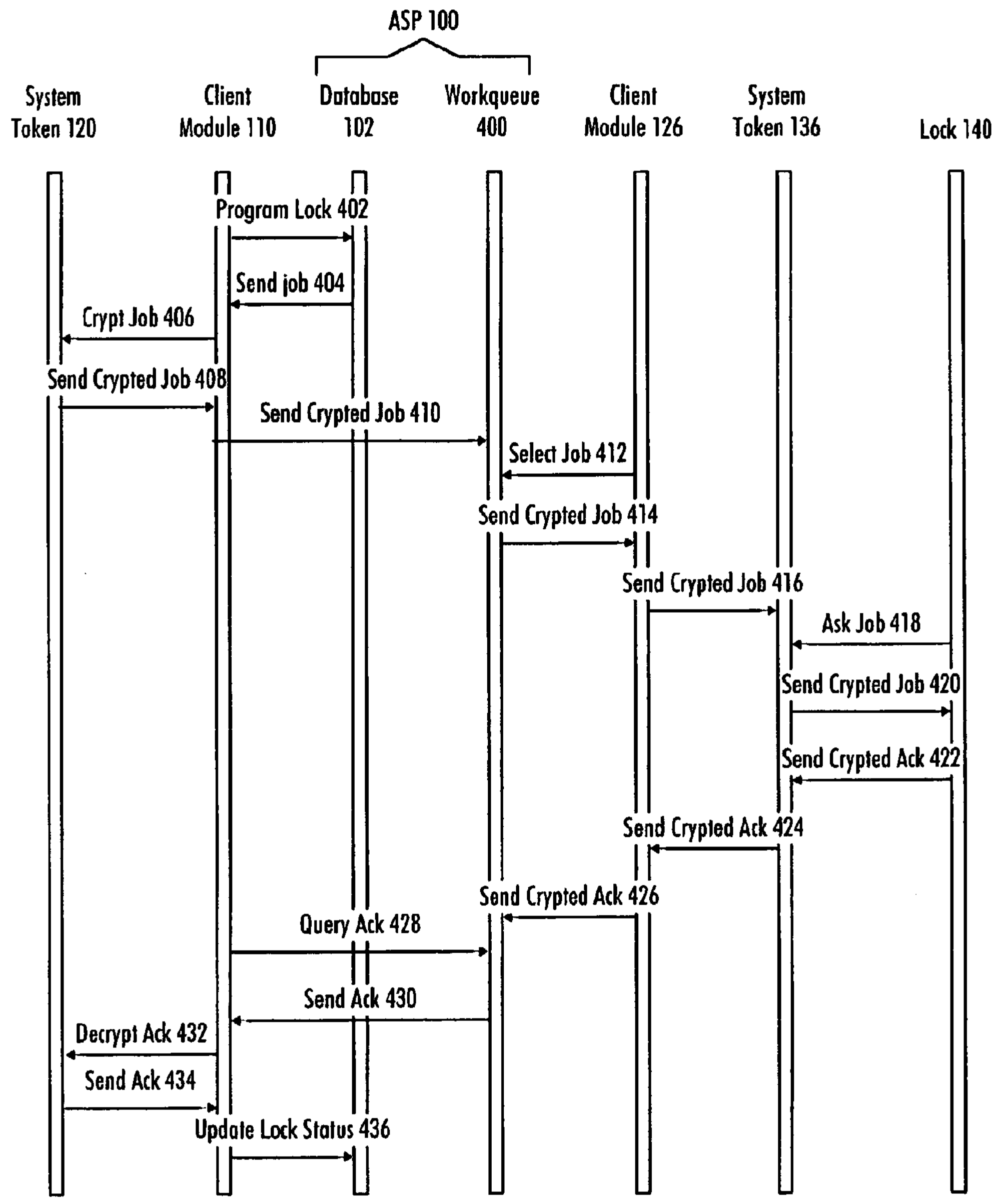
FIG. 4 is a signaling chart illustrating an embodiment of the invention.

FIG. 4 illustrates an example where an access right to a lock 140 is changed by the user using the client module 110. The client module 110 is responsible for controlling the initial part of the access right change. As the client module resides in a client terminal 108 the procedure may be performed at the client's premises provided that the client module has Internet access. Before the process starts, the system token 120 is placed in the device 114 and the device 114 is connected to the client terminal 108 and the client module 110. In addition, the client module logs in to the ASP server 100.

The ASP server maintains a database 102 where information on the locking system's locks, keys and access rights are stored. However, the access rights may not be changed at the ASP server. The changing of the access rights requires the use of a client module 110, 126 and a system token connected to the client module via the device 114, 130.

In an embodiment, the client module provides the user of the system an interface to change the access rights and to program the locks and the keys. The client module 110 is configured to receive new lock access data from the user. As such data is received, the client module 110 sends a Program Lock message 402 to the database 102 maintained by the ASP server 100.

The ASP server 100 stores the received data into the database 102 and sends modified lock access data back to the Client Module 110 as a Send Job message 404. The client module 110 receives the message and sends the data as a Crypt Job message 406 to the system token 120 connected to the device 114. The system token 120 encrypts the access data with the locking system shared secret and sends the encrypted lock access data to the client module 110 as a Send Crypted Job message 408. The client module receives the encrypted data and sends it to the ASP server 100 as a Send Crypted Job message 410. The ASP server 100 places the data into a work queue 400 which is a part of the database 102. The work queue 400 is a list of encrypted access data messages which are to be transmitted to a lock later. The client module 110 may log out of the ASP server 100.

The remaining steps of the procedure are performed at the site where the lock is installed. First, the user logs in the ASP server 100 from the client module 126. At the user's command, the client module contacts the ASP server and selects a job for a lock to be programmed from the work queue 400 with a message 412. The work queue 400 replies by sending encrypted lock access data in a message 414. The client module 126 receives the job and stores it in the memory of the client terminal 124. The lock access data contained by the job data is encrypted and it is not a security risk to store the data in the client terminal 124.

Next, the system token 136 is placed to device 130. A connection between the device 130 and the client terminal 124 and the client module 126 is established. The client module is configured to send encrypted lock access data 416 to the system token 136 when receiving a Program Lock command from the user. The user connects the device 130 to the lock 140 to be programmed. When the lock 140 detects that a connection with the device 130 has been established the lock is configured to request 418 lock access data from the system token 136. In an embodiment, the lock is configured to authenticate the system token before requesting the data.

The system token 136 replies by sending the encrypted data 420. The lock 140 decrypts the data and validates its signature using the shared secret stored in the lock. If the data is valid the lock 140 stores the data and sends an encrypted acknowledgement message 422 comprising the lock programming status to the System Token 136 indicating that the access data of the lock has been programmed. If the data is not valid the lock 140 ignores the data and sends a negative acknowledgement 422 to the system token 136 indicating that the lock programming failed. In an embodiment, the device 130 is configured to inform the user about the success of the lock programming with a visual indication, such as a green or a red led.

The system token 136 sends the encrypted lock programming status 424 to the client module 126. The client module 126 sends the encrypted lock programming status 426 to the work queue 400.

The lock programming status remains in the work queue 400 until the client module connected to the system token 120 establishes a session with the ASP server 100. The client module may be configured to check 428 the work queue 400 when connected to the ASP server 100. As a response to the query message 428 the ASP server 100 sends 430 the encrypted lock programming status to the client module 110.

When receiving the encrypted status message 430 the client module 110 sends 432 the message to the system token 120 which decrypts the data and replies by sending the decrypted data 434 to the client module 110. The client module sends the data 436 comprising the lock 140 status to the ASP server 100 which stores the lock status in the database 102.

The procedure described in connection with FIG. 3C installs the locking system shared secret to a lock. Before the locking system shared secret is installed a lock may be in an initial state. An initial-state lock does not yet belong to any locking system. It is not configured to authenticate any keys and validate access data of the keys. The locking system shared secret may also be removed from a lock in a procedure similar to the procedure of FIG. 3C. In an embodiment, the client module 110 is configured to generate lock access data packets comprising a command restoring a lock to an initial state. After the shared secret has been uninstalled the lock is back again in the initial state and it can be reused in another locking system without any security risk. A lock without a locking system shared secret does not have any stored security sensitive information.

When the locking system shared secret is installed into the lock using the procedure of FIG. 3C the lock is a member of the locking system. Only the keys belonging to the locking system can open the lock. However, the lock does not validate any additional access data. This state of the lock may be called a commissioned state.

The locking system shared secret is generated on the basis of a seed given by the user with the system token 120 in the device 114 or the client module 110 as described in FIG. 3A. The locking system shared secret is stored in the system token in a write-only memory.

Locks belonging to a system administrated by the described lock administration system have the ability to calculate the locking system shared secret as the system tokens. Keys have unique secrets generated from the unique identification of each key and the locking system shared secret. The locks are configured to generate the key secret on the basis of the unique identification read from a key and the locking system shared secret stored in the lock.

When lock access groups are installed into a lock using the procedure described in FIG. 4, the lock is able to authenticate keys and validate key access data. This state of the lock may be described as an operating state. The key access data validation is explained further in European Patent Application 07112675 which is incorporated here in as a reference.

Figure 5:
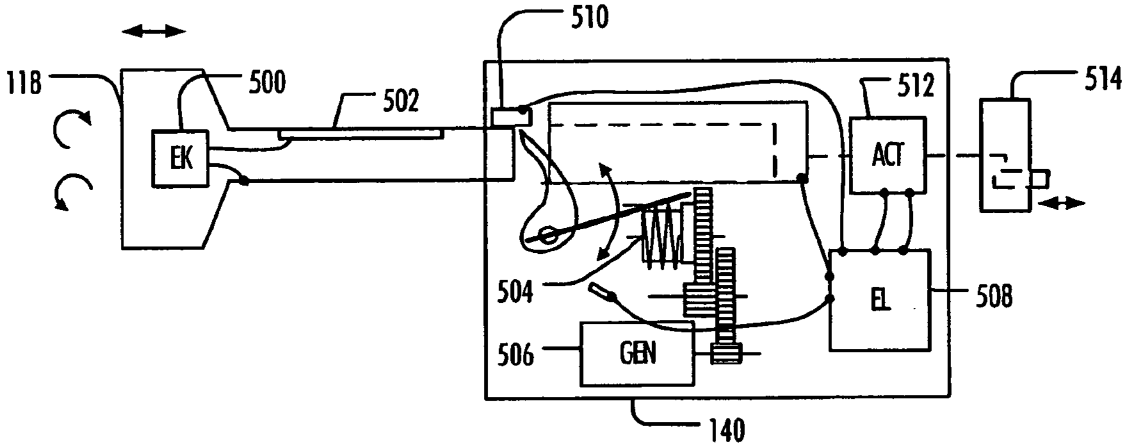
FIG. 5 illustrates another example of a key and a lock.

FIG. 5 illustrates an example of a key 118 and a lock 140. In the example of FIG. 5, the key 118 comprises an electronic circuit 500 connected to a contact arrangement 502 and a key frame. The electronic circuit 500 may comprise a memory unit. The electromechanical lock 140 of FIG. 1 is a self-powered lock. The lock 140 comprises power transmission mechanics 504 which transforms mechanic energy from a user to an electric generator 506 powering the electronic circuit 508 when the key 118 is inserted into the lock 140. In this example, the electronic circuit 508 is configured to communicate with the electronic circuit 500 of the key through a contact arrangement 510 and the contact arrangement 502 of the key. The communication may be realized as a wireless connection or by physical conductivity.

The electronic circuit 508 is configured to read key data from the electronic circuit 500 of the key 118 upon the key insertion. The electronic circuit 508 is further configured to authenticate the key and validate the access data as previously described. The electronic circuit may comprise a processor and a memory unit for storing data and required software for the processor. The software may be configured to perform the previously described procedures related to generating the locking system shared secret, updating the access data and authenticating the keys.

The lock of FIG. 5 further comprises an actuator 512 configured to receive the open command, and to set the lock in a mechanically openable state. The actuator may be powered by the electric power produced with the generator 506. The actuator 512 may be set to the locked state mechanically, but a detailed discussion thereon is not necessary to illuminate the present embodiments.

When the actuator 512 has set the lock in a mechanically openable state a bolt mechanism 514 can be moved by rotating the key 118, for example. The mechanical power required may also be produced by the user by turning a handle or a knob of a door (not shown in FIG. 5). Other suitable turning mechanisms may be used as well.

The steps and related functions described above are in no absolute chronological order, and some of the steps may be performed simultaneously or in an order differing from the given one. Other functions can also be executed between the steps or within the steps. Some of the steps or part of the steps can also be left out or replaced by a corresponding step or part of the step.

It will be obvious to a person skilled in the art that, as technology advances, the inventive concept can be implemented in various ways. The invention and its embodiments are not limited to the examples described above but may vary within the scope of the claims.

The invention claimed is:

1. A lock administration system for self-powered locks, comprising:

an ASP (application service provider) server, at least one lock, at least one client module, a first device and a system token that are each configured to store lock system related information;

the system token being configured to a store locking system secret for programming keys and locks, the at least one client module configured to:

control the first device to program keys utilizing the system token by generating shared secrets for encrypting and decrypting;

control the first device to program lock access packets utilizing the system token by shared secrets for encrypting and decrypting;

transmit the lock access packets to the ASP server using public networks;

receive an encrypted status packet from the ASP server using public networks;

control the decrypting of the status packet utilizing the system token; and send information regarding the decrypt status packet to the ASP server using public networks;

the ASP server being configured to be connected to the Internet; and maintain a database for storing lock and key access data and for temporarily storing lock access packets and encrypted status packets;

and at least one lock configured to:

receive data packets from the ASP server via public networks; and decrypt the data packets utilizing a system token and send an encrypted status packet to the ASP server using public networks.

2. The lock administration system of claim 1, wherein a client module is configured to control the first device to generate lock access data packets comprising information about the locking system to which a lock belongs to and about access rights of the lock.

3. The lock administration system of claim 1, wherein a client module is configured to control the first device to generate lock access data packets comprising a command restoring a lock to initial state.

4. The lock administration system of claim 1, wherein the first device is configured to be in connection with a key, a client module and to communicate with the system token.

5. The lock administration system of claim 1, comprising a second device configured to be in connection with a lock and to communicate with the system token.

6. The lock administration system of claim 5, comprising a second client module configured to be in connection with the ASP server using public networks and with the second device through a wired or wireless connection.

7. The lock administration system of claim 6, wherein the second client module is configured to receive a lock access data packet from the ASP server and transmit the packet to a lock via the second device.

8. The lock administration system of claim 6, wherein the second client module is configured to receive an encrypted status packet from a lock via the second device and transmit the packet to the ASP server.

9. The lock administration system of claim 6, wherein the connection between the second client module and the ASP server is at least partly wireless.

10. The lock administration system of claim 6, wherein the system comprises a second client module in a mobile terminal.

11. A method for administrating a system for self-powered locks, comprising the steps of:

controlling a first device by a client module in the programming of keys utilizing a system token by generating shared secrets for encrypting and decrypting;

controlling a first device by a client module in the programming of lock access data packets utilizing a system token by generating shared secrets for encrypting and decrypting;

encrypting the generated lock access data packets using the system token;

transmitting the encrypted data packets to an ASP (application service provider) server using public networks;

storing the encrypted data packets in the ASP server;

reading the encrypted data packets by a lock from the server via public networks;

decrypting the data packets in the lock;

generating encrypted status packet in the lock and transmitting the encrypted status packet to the ASP server;

reading a status packet from the ASP server and controlling the decrypting of the status packet by a client module; and transmitting information regarding the decrypt status packet from the client module to the ASP server.

12. The method of claim 11, further comprising:

generating, in a client module lock, access data packets comprising information about a locking system to which a lock belongs and about access rights of the lock.

13. The method of claim 11, further comprising:

generating, in a client module lock, access data packets comprising a lock command "restore to initial state".

* * * * *